Jan. 25, 1966  J. ROSÁN  3,230,994
INSERT HAVING AN EXPANDABLE SPLIT LOCKING COLLAR AND
METHOD OF USING SAME
Original Filed Dec. 12, 1960
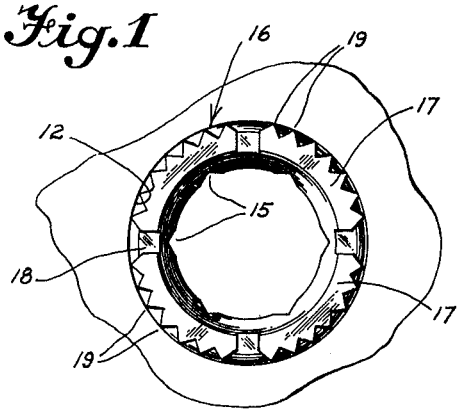
Fig. 1
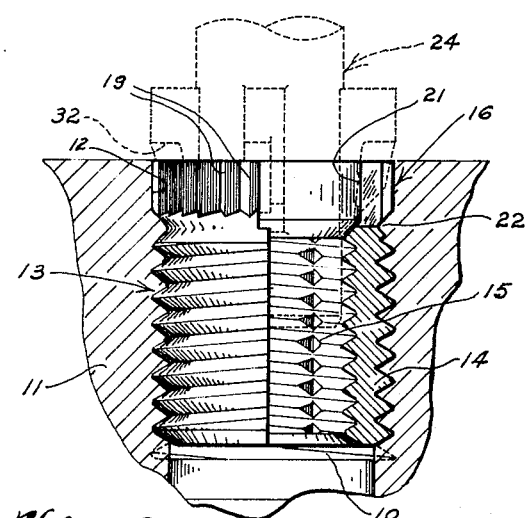
Fig. 2
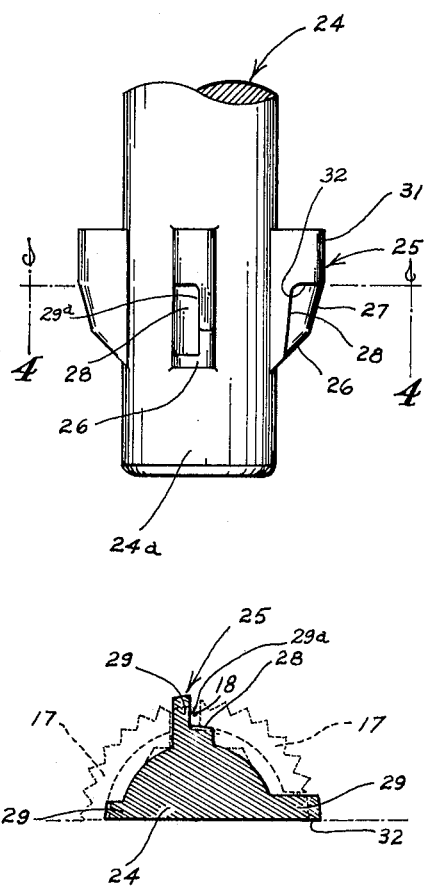
Fig. 3
Fig. 4
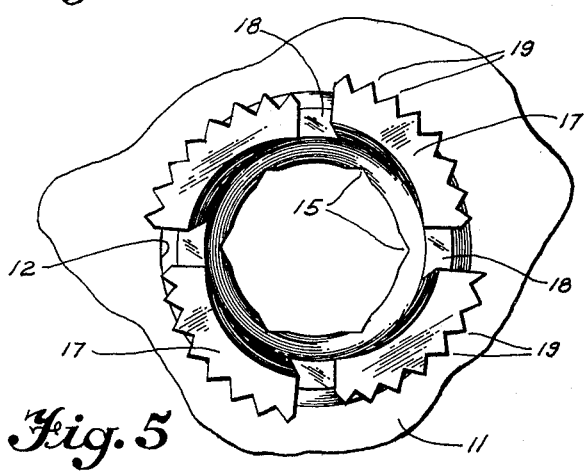
Fig. 5
INVENTOR.
José Rosán
BY
ATTORNEY United States Patent Office 3,230,994
Patented Jan. 25, 1966

3,230,994
INSERT HAVING AN EXPANDABLE SPLIT LOCK-
ING COLLAR AND METHOD OF USING SAME
José Rosán, San Juan Capistrano, Calif., assignor to
Rosán Engineering Corp., Newport Beach, Calif., a
corporation of California
Continuation of application Ser. No. 75,411, Dec. 12,
1960. This application Aug. 10, 1964, Ser. No. 392,068
3 Claims. (Cl. 151—41.72)

This application is a continuation from my prior copending application Serial No. 75,411, entitled "Insert Having an Expandable Split Locking Collar," which was filed on December 12, 1960, now abandoned.

This invention relates to threaded inserts and to a method of locking such inserts in threaded bores.

Inserts of the type to which the present invention is directed have externally threaded bodies adapted to be installed in threaded bores in a workpiece or parent element. Such inserts are adapted to receive conventional threaded fasteners, and provide numerous important results and advantages in comparison to constructions in which the threaded fasteners are merely threaded directly into the workpiece. Such results or advantages include increased wear resistance, increased strength, and improved resistance to unthreading due to vibration and other factors. It is to be understood that inserts are normally, but not always, formed of harder material than the parent or workpiece material into which they are threaded. Thus, for example, a steel or stainless steel insert may be employed in conjunction with a workpiece formed of aluminum, plastic, etc.

In the past it was preferred to lock such an insert in place by means of a separate serrated lock ring adapted to interfit with the serrated outer end of the insert. More recently, inserts have eliminated the use of a lock ring and were locked against torque forces by expanding one or more portions along the length of the insert, for example, the portion at the outer end thereof. In effect, an impact extrusion process is performed on the top portion of the inserts. This portion is substantially outwardly deformed into the parent material without producing sharp corners. In these constructions, expansion occurs about substantially the full 360° circumference of the insert. It should be noted that the expanded portions of these inserts are continuous in order to preserve sufficient hoop strength therein to adequately maintain the insert locked into a workpiece.

In the insert of the present application, at least one section along the length of the insert, such as at the outer end thereof, is separated by longitudinal slots into a number of segments or sections. These sections are distinct and separate from each other except that each is integral with the remainder of the insert. Locking of such an insert in a threaded bore is achieved by expanding only one edge of each segment, preferably the edge opposite to the direction of threading, or the "trailing" edge thereof. The expanded portions of the segments are thereby "work hardened" and have a greater resistance to further deformation than the adjoining segment material. Upon expansion of the trailing edge of each segment, the expanded edge will deform a depression or pocket into the bore wall in which the expanded segment edge will be accommodated. Thus, upon the application of a torque force opposite to the threading direction, the expanded edge of each segment of the insert will abut against a wall of the depression or pocket, thereby prohibiting rotation in that direction. Consequently, this provides a locking action which maintains the insert in the bore with extremely high resistance to unthreading, the locking action being somewhat analogous to that effected by a one-way or roller-type clutch. The present application is also directed to a novel method for effecting such predetermined expansion of the separate segments or sections, all in a highly simple yet effective manner.

It is a principal object of the present invention to provide an insert which may be locked in position without use of a separate lock ring, and which has a very high resistance to torque and particularly to unthreading forces.

Another object is to provide an insert which makes use not only of longitudinal serrations but also of a binding or wedging action in order to create an extreme resistance to forces tending to effect unthreading of the insert.

Still another object is to provide a lock resistant to torque by forming an accommodating abutment depression.

Another object is to provide a threaded insert characterized by the provision of longitudinal slots at spaced points about the circumference thereof and at the outer end thereof.

Another object is to provide a novel method of locking an insert in a workpiece.

These and other objects and advantages of the invention will be more fully set forth in the following specification and claims, considered in connection with the attached drawing to which they relate.

In the drawing:
FIGURE 1 is a plan view illustrating an insert constructed in accordance with the present invention threaded into a bore in a workpiece or body of parent material, the latter being fragmentarily illustrated;
FIGURE 2 is a view, in quarter-section, showing the insert as threaded into the bore and illustrating the locking tool in dotted lines;
FIGURE 3 is a side elevation of the locking tool;
FIGURE 4 is a fragmentary section taken on line 4—4 of FIGURE 3 and illustrating in dotted lines various segments of the insert; and
FIGURE 5 is a plan view corresponding to FIGURE 1 but illustrating the condition of the segments and the associated portions of the workpiece subsequent to expansion by means of the locking tool.

The insert is illustrated as mounted in a bore 10 (see FIG. 2) in a workpiece or parent element 11, the latter being formed of a suitable material such as aluminum or plastic. Bore 10 is threaded throughout the majority of its length but is counterbored at its outer end to provide the cylindrical wall indicated at 12.

The insert of the invention is indicated generally at 13, being formed with a tubular shank 14, which is externally threaded for mating with the internal threads of bore 10. In addition, a shank 14 is internally threaded in order that a conventional threaded fastener, such as a bolt, not shown, may be mounted therein. The internal threads of shank 14 are suitably broached at spaced points to provide driving grooves or flutes 15 which extend longitudinally of the shank and are adapted to receive a suitable driving tool. In the illustrated form, six driving grooves are illustrated, in order to receive a generally hexagonal driving tool, but it is to be understood that any suitable number may be employed.

Formed integrally at the outer end of shank 14 is a head or collar 16 comprising a plurality of segments or sections 17, and separated by slots 18 which extend longitudinally to the axis of the insert. In the illustrated form, four such segments 17 are illustrated, with each segment occupying substantially a 90° portion of the circumference of the insert. It is to be understood, however, that the number of segments may be varied if desired.

The outer surfaces of each of the segments 17 are longitudinally serrated or knurled in order to form teeth 19. The head and the teeth are so formed that the teeth are initially disposed closely adjacent the cylindrical wall 12 of the counterbore, but not sufficiently close to provide substantial interference with threading of the insert into bore 10.

As best seen in FIGURE 2, the outer end of the insert is formed with a counterbore 21 throughout substantially the full length of head 16. In addition, an annular groove 22, illustrated as being V-shaped in section, is formed externally of the insert between the head 16 and shank 14. This groove cooperates with counterbore 21 in providing a reduced section or wall thickness adapted to facilitate outward expansion of portions of the various segments 17 as will be described subsequently.

Referring particularly to FIGURES 2–4, the locking tool for the insert is indicated generally at 24 and is cylindrical in shape except as will be described. The diameter of the cylinder is such that the lower end thereof, which may be termed a pilot portion 24a, may be inserted into the shank 14 in close-fitting but readily slidable relationship.

Formed about the circumference of the locking tool 24 are a plurality of wings 25, there being one such wing for each of the slots 18. Each wing has a lower inclined surface 26, disposed generally in a plane which is oblique to the axis of the locking tool, and adapted to cooperate with pilot 24a in facilitating proper introduction of the locking tool into the insert. Formed above each of the lower inclined surfaces 26 are two surfaces 27 and 28 which are generally parallel to each other and are also oblique to the axis of the locking tool, but less oblique than is each surface 26. Each surface 27 may be termed the outer surface since it is disposed a substantial distance radially outwardly from the associated surface 28. Each such surface 27 forms a part of a guide portion 29 which is adapted to be inserted into a slot 18 as best illustrated in FIGURE 4. The locking tool 24 is thus properly aligned so that the inner surface 28, which may be termed a wedge or expansion surface, will be in the exact position required to produce outward expansion of only the trailing edge of the associated segment 17.

The upper portion of each wing 25 has an outer surface 31 which is generally a section of a cylinder, there being a radial shoulder 32 formed above the wedge surface 28 adjacent the junction of surface 27 with surface 31.

From the above it will be understood that the wedge surface 28 and the adjacent radial side wall 29a of guide portion 29 form, together with the shoulder 32, three walls of a recess which is provided in each of the wings 25. Because of the radially-offset relationship between the surfaces 27 and 28 of each wing, surface 27 intersects surface 26 at a line substantially above the line of intersection between wedge surface 28 and surface 26.

The surfaces of each wing 25 are so disposed and related that, upon initial insertion of the locking tool into the insert, wedge surface 28 will engage a portion of an associated segment 17 at a location adjacent a slot 18. Such engagement occurs while the shoulder 32 is spaced a substantial distance above the segment, and also while the lower inclined surface 26 is disposed a substantial distance above a beveled or frusto-conical wall which is formed internally of the insert at the lower end of counterbore 21. There is thus space or clearance room permitting the locking tool to be driven into the insert, creating a wedging and expansion action between each surface 28 and the engaged portion of each segment 17.

The degree of inclination or obliqueness of each wedge surface 28 is such that, upon tapping or driving of the locking tool with a hammer or the like, the locking tool causes the engaged portion of each segment to be expanded radially outwardly to the position shown in FIGURE 5. Because of the initial positioning of the teeth 19 closely adjacent wall 12 of the counterbore in the parent material, such outward expansion of a portion of each segment 17 causes the teeth on such portion to bite into the parent material and create longitudinal serrations therein.

The locking tool is so correlated to the threads of the insert that the expanded portions of the various segments 17 will be disposed in advance of the relatively unexpanded portions thereof upon turning of the insert in a direction effecting unthreading thereof from the parent material or workpiece. The result is a binding, wedging or sprag action, somewhat in the nature of that effected by a one-way clutch, which creates an extremely strong lock preventing the insert from becoming unthreaded. In this connected, it is pointed out that the deformation of the wall 12 of the counterbore in the workpiece is not uniform, as is the case with conventional inserts. Instead, the deformation occurs at the trailing edge of each segment in a predetermined manner so that an attempt to unthread the insert from the workpiece causes the teeth of the insert to lock and bind in the recessed portions of the counterbore wall 12 and enhance the locking action.

To thread the insert into a threaded bore 10 provided with a counterbore 21, it is merely necessary to insert a suitable tool into the longitudinal grooves 15 and rotate the insert to provide a threading action until the upper surface of the insert is flush with or slightly beneath the face of the workpiece or parent material 11. Thereafter, it is merely necessary to insert the pilot portion 24a of the locking tool into the internally-threaded shank of the insert, and to turn the insert to such a rotated position that the guide portions 29 (having outer oblique surfaces 27) are inserted into the respective slots 18 between segments 17.

A hammer blow is then imparted to the locking tool to drive the same a substantial additional distance into the insert. This creates a wedging action between wedge surfaces 28 and the trailing edge of segments 17 adjacent slots 18. The result is that the edge portion of each segment which is engaged by wedge surface 28 is expanded or bent radially outward until the teeth 19 thereof bite into and deform the cylindrical wall 12 of the workpiece counterbore, effecting a cold working or brinelling of the parent material around the counterbore. On the other hand, the portion of each segment remote from wedge surface 28 is not expanded radially outward. The above-described wedging relationship is thereby created, which effectively prevents the insert from being rotated out of the bore 10. It is to be understood that the relatively thin section between each segment 17 and the shank 14, that is to say between the counterbore 21 and the bottom of annular groove 22, facilitates the above-indicated outward bending or radial expansion of the trailing edge portions of the segments. After the insert is thus locked in place, it is merely necessary to withdraw the locking tool and thread into the shank 14 a suitable fastener such as a stud bolt.

It is to be understood that the degree of radial expansion of the portions of segments 17 is sufficient to give such portions a permanent set, the expansion being beyond the elastic limit of the insert material.

It is to be further understood that although the insert of the instant invention is described as having a serrated head and a bore provided with a counterbore, said insert may have a nonserrated head utilized in conjunction with a bore which is not provided with a counterbore, without departing from the scope of the invention.

While several embodiments of the invention and their use have been described, it is, of course, understood that the particular embodiments of the invention herein disclosed are for illustrative purposes only, and that various changes may be made therein without departing from the principles of the invention or the scope of the annexed claims.

I claim:

1. The method of installing an internally threaded insert in a bore of a workpiece comprising a tubular screw threaded body having an externally serrated head portion formed by a plurality of segments separated by slots, which comprises threading an insert into said workpiece until said head portion of said insert is recessed into said workpiece; after fully threading said insert into said workpiece, deforming outwardly and radially by an axially moving tool only the trailing edge of each segment relative to the direction of threading into said bore of said insert to cause said deformed edge to bite into said workpiece and bind therewith, said segment edges being initially unexpanded, said deformed edge being adapted to effect a cold working of the workpiece immediately surrounding said head portion.

2. The method of installing an internally threaded insert in a bore of a workpiece comprising a tubular screw threaded body having an externally serrated head portion formed by a plurality of segments separated by slots, which comprises: threading an insert into said workpiece until said head portion of said insert is recessed into said workpiece; after fully threading said insert into said workpiece engaging the trailing edge of each segment relative to the direction of threading into said bore of said insert, deforming outwardly and radially by an axially moving tool said edge only so as to cause said edge to bite into said workpiece and bind therewith, said edge being initially unexpanded, said deformed edge being adapted to effect a cold working of the workpiece adjacent thereto.

3. In combination, a workpiece having a threaded bore with a fastener comprising: a cylindrical body having external threads engaged with the threads of said workpiece bore, said body being provided with a threaded bore and a counterbore; said body having a head portion defined by a plurality of segments separated by slots, said segments being provided with external longitudinal serrations, at least a portion of which are embedded into the wall of said counterbore, only the edge of each segment opposite the direction of threading into said bore being outwardly and radially deformed, said segment edges being initially unexpanded; depressions in the wall of said bore formed by the radial expansion of said segment edges, said depressions accommodating said segment edges, at least one portion of said depressions forming abutment means engaged by said segment edges so as to resist rotational movement of the insert relative to the workpiece opposite to the direction of threading.

References Cited by the Examiner
UNITED STATES PATENTS

| | | | |
|---|---|---|---|
| 1,116,710 | 11/1914 | Keller | 85—84 |
| 1,767,287 | 6/1930 | Hosking | 151—22 |
| 2,577,810 | 12/1951 | Rosan | 151—41.72 |
| 2,886,090 | 12/1959 | Rosan | 151—41.72 |

FOREIGN PATENTS

| | | |
|---|---|---|
| 453,942 | 1/1949 | Canada. |
| 586,126 | 10/1933 | Germany. |

EDWARD C. ALLEN, *Primary Examiner.*